United States Patent [19]

Neff

[11] Patent Number: 5,578,099
[45] Date of Patent: *Nov. 26, 1996

[54] ARTICLE AND METHOD FOR PRODUCING AN ARTICLE HAVING A HIGH FRICTION SURFACE

[76] Inventor: Charles E. Neff, 384 McKinely, Grosse Pointe Farms, Mich. 48236

[*] Notice: The term of this patent shall not extend beyond the expiration date of Pat. No. 5,213,590.

[21] Appl. No.: 66,491

[22] Filed: May 24, 1993

Related U.S. Application Data

[60] Division of Ser. No. 937,238, Aug. 28, 1992, Pat. No. 5,213,590, which is a continuation-in-part of Ser. No. 453,684, Dec. 20, 1989, Pat. No. 5,181,939.

[51] Int. Cl.⁶ .................................................. B24D 11/00
[52] U.S. Cl. .................. 51/297; 451/529; 451/530; 451/542
[58] Field of Search ................... 51/295, 297; 209/8; 451/529, 530, 542

[56] References Cited

U.S. PATENT DOCUMENTS

| | | | |
|---|---|---|---|
| 3,710,466 | 1/1973 | Williamson et al. | 29/27 R |
| 3,913,217 | 10/1975 | Misawa et al. | 156/344 |
| 4,240,807 | 12/1980 | Kronzer | 51/295 |
| 4,255,164 | 3/1981 | Butzke et al. | 51/295 |
| 4,298,356 | 11/1981 | Teschner et al. | 51/295 |
| 4,317,660 | 3/1982 | Kramis et al. | 51/295 |
| 4,538,655 | 9/1985 | Berkeley | 144/230 |
| 4,866,885 | 9/1989 | Dodsworth | 51/295 |
| 4,916,869 | 4/1990 | Oliver | 51/293 |
| 4,945,686 | 8/1990 | Wiand | 51/295 |
| 4,972,637 | 11/1990 | Dyer | 51/295 |
| 5,007,207 | 4/1991 | Phaal | 51/207 |
| 5,014,468 | 5/1991 | Ravipati et al. | 51/295 |
| 5,181,939 | 1/1993 | Neff | 51/298 |
| 5,213,590 | 5/1993 | Neff | 51/293 |
| 5,250,084 | 10/1993 | Lansell et al. | 51/293 |
| 5,304,223 | 4/1994 | Dieper et al. | 51/293 |
| 5,336,279 | 8/1994 | Neff | 51/293 |

Primary Examiner—Deborah Jones
Attorney, Agent, or Firm—Leydig, Voit & Mayer, LTD

[57] ABSTRACT

Abrasive tools with preferential arrangements and patterns of abrasive elements which accomplish a range of performance goals and optimize both removal rate and finish are disclosed.

1 Claim, 8 Drawing Sheets

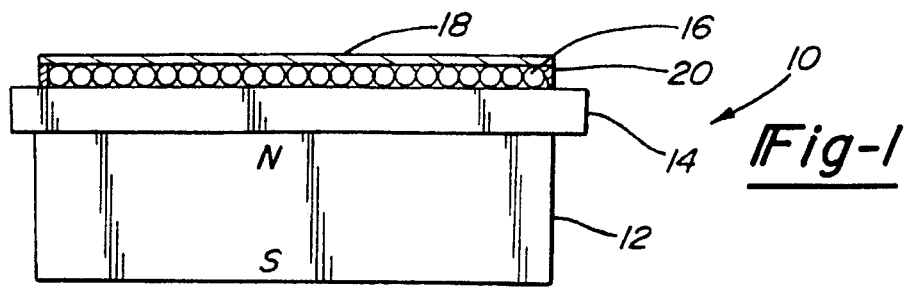
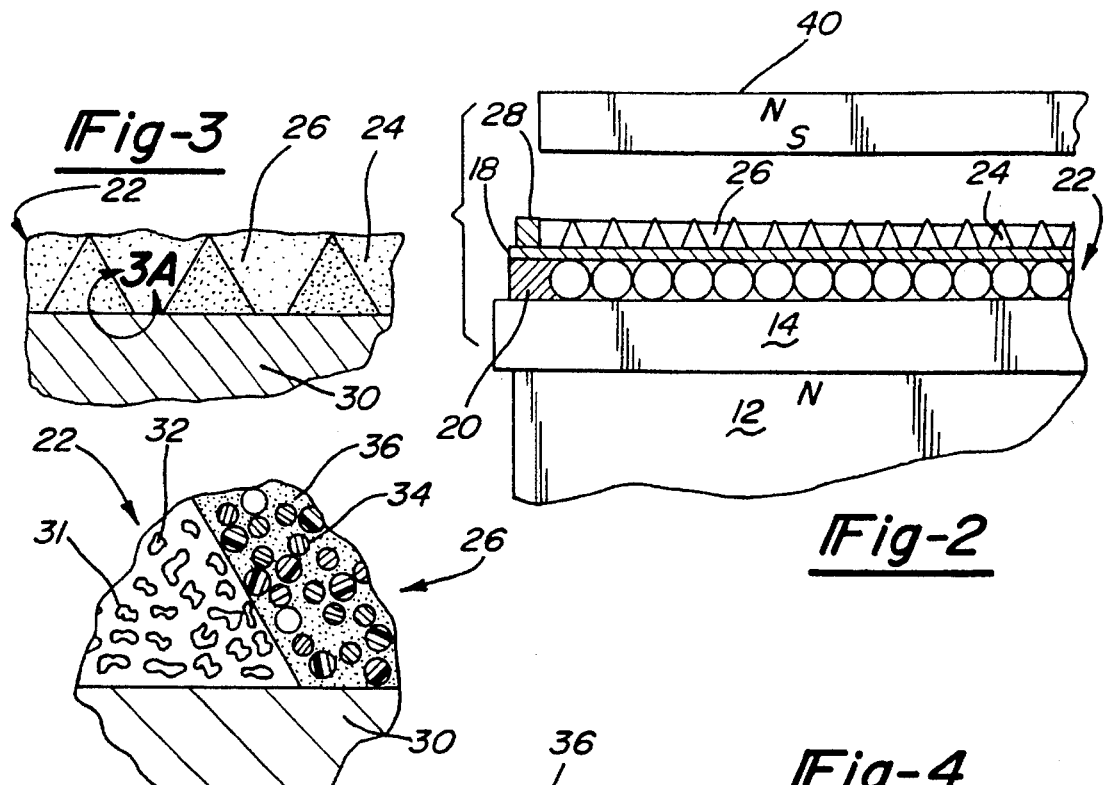
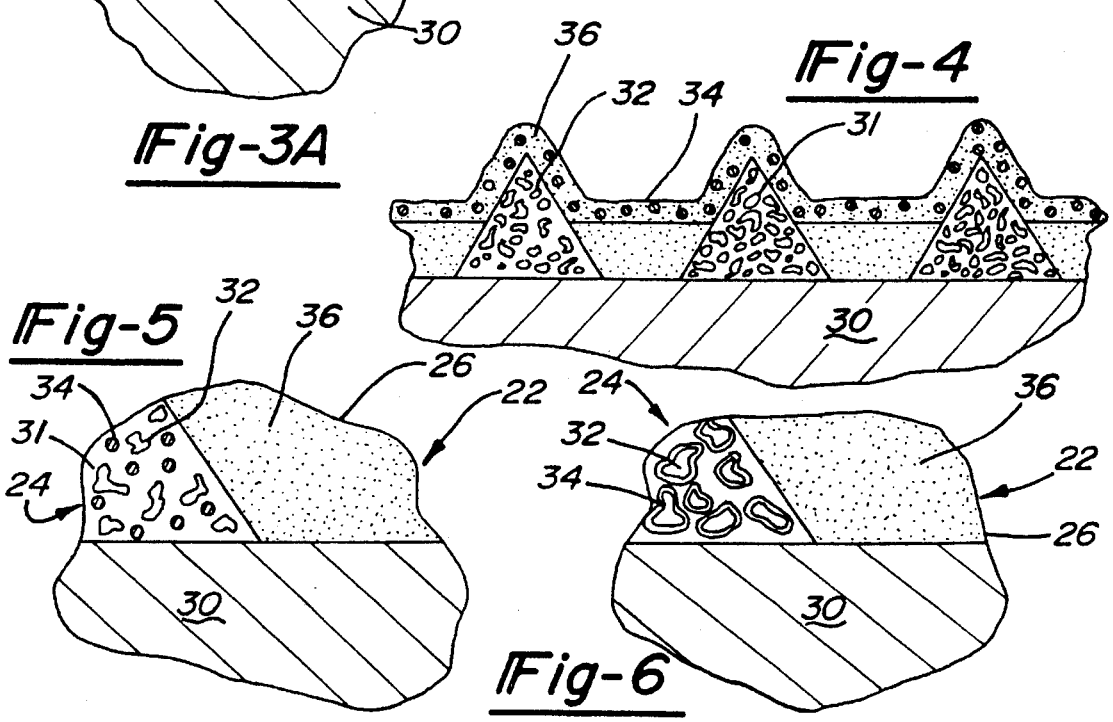

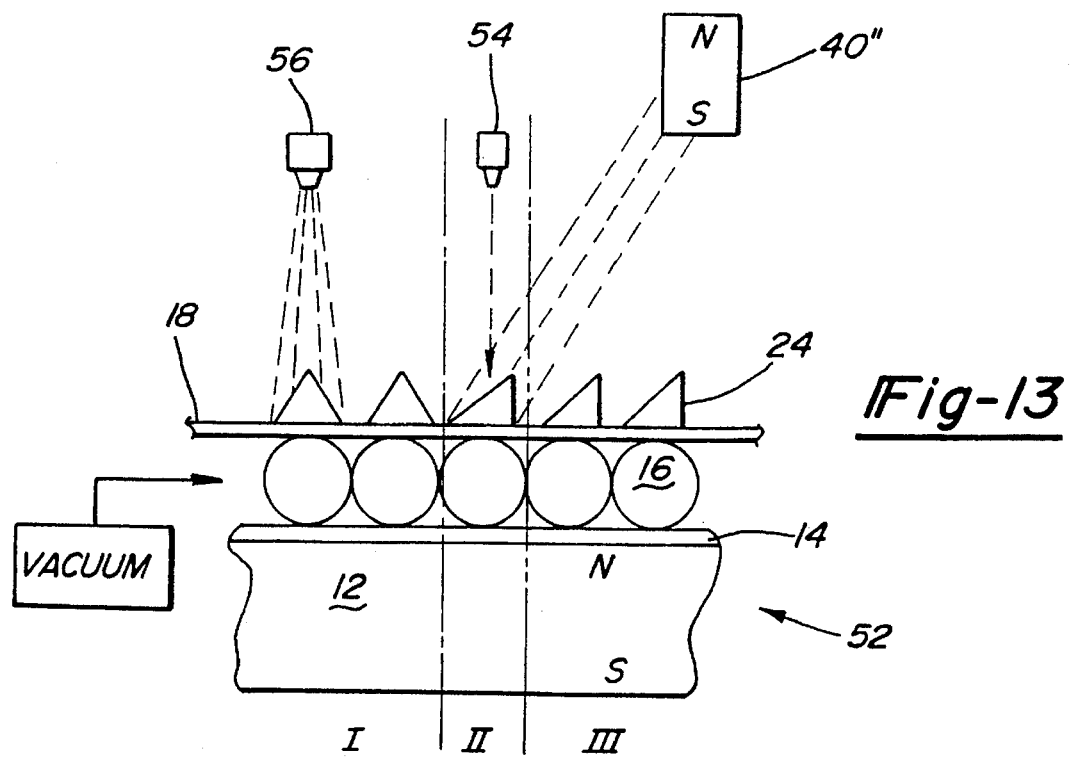
_Fig-13_
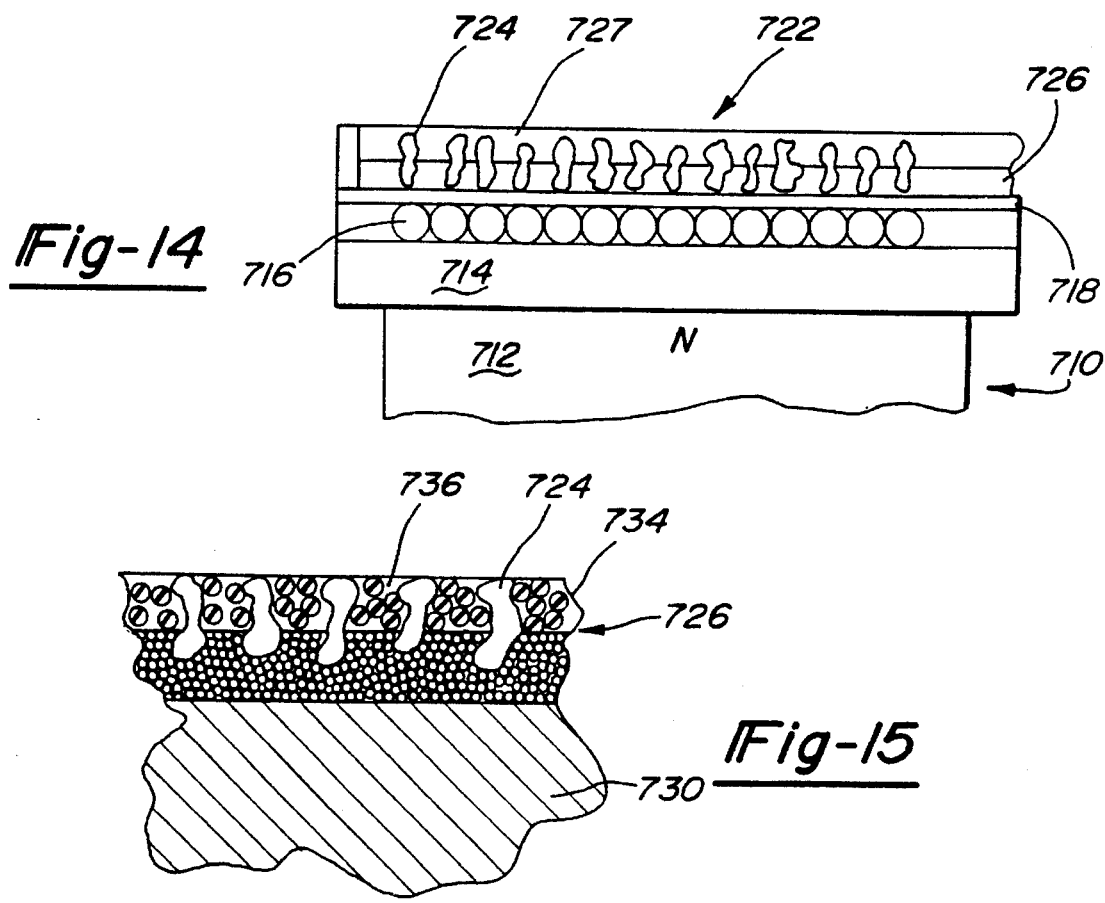
_Fig-14_
_Fig-15_

| DEGREES | PROFILE |
|---|---|
| 30<br>90 | ∧∧∧∧∧∧ |
| 0.0<br>60 | ∧∧∧∧∧∧ |
| ± 10<br>50<br>70 | ∧∧∧∧∧∧ |

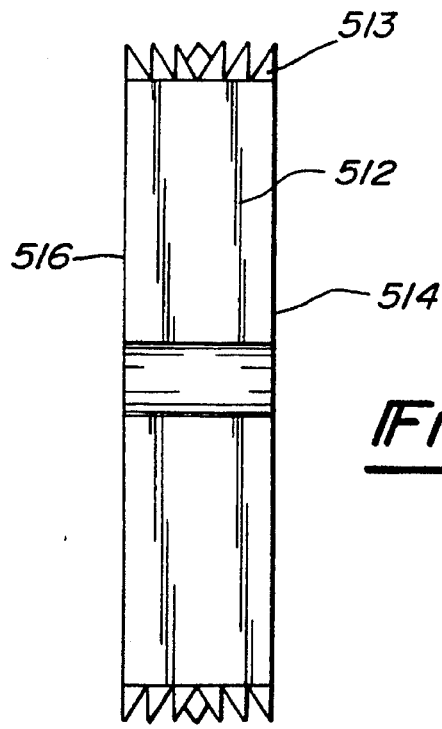
*Fig-29*
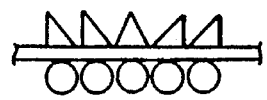
*Fig-30*
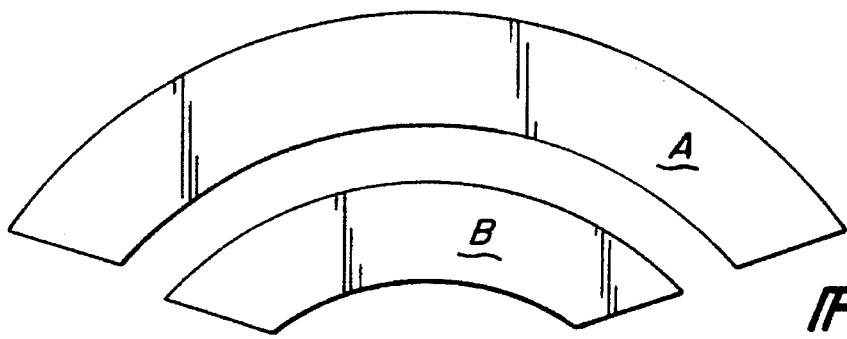
*Fig-31*
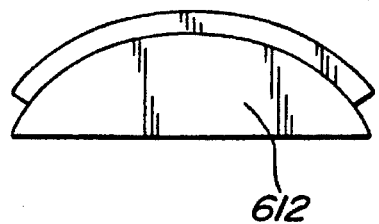
*Fig-32*

5,578,099

ARTICLE AND METHOD FOR PRODUCING AN ARTICLE HAVING A HIGH FRICTION SURFACE

BACKGROUND OF THE INVENTION

This application is a divisional of application U.S. Ser. No. 07/937,238, filed on Aug. 28, 1992, now U.S. Pat. No 5,213,590 which is a continuation-in-part of application U.S. Ser. No. 07/453,684, filed Dec. 20, 1989 now U.S. Pat. No. 5,181,939.

FIELD OF THE INVENTION

This invention relates to high friction surfaces for use in abrasive applications and the preparation of such high friction surfaces. In particular, the present invention relates to abrasive tools prepared by use of a matrix of braze paste and abrasive particles which have been prepared on a fixture.

DESCRIPTION OF THE PRIOR ART

U.S. Pat. No. 3,913,217, hereinafter referred to as Oliver I, discloses an abrasive tool comprising a tool blank having small steel balls secured thereto which have been armed with magnetically oriented carbide particles. The carbide particles are secured together and to the balls by a braze alloy. An Oliver I type tool is typically prepared, in part, by first securing a single layer of small steel balls to the surface of a tool blank. A magnet is then secured to the tool blank below the balls. Next, magnetizable carbide particles are sprinkled onto the small steel balls. The magnetic flux concentrations produced by the flux path passing through the small steel balls cause carbide particles to collect on the outermost portions of the balls to form conical structures. A braze paste consisting of a binder and a braze alloy is then applied to encapsulate all of the elements of the assembly. Finally, the entire assembly is subjected to heating in a brazing furnace which bonds the braze alloy, the magnetizable particles and the balls into a unified structure. When the assembly has cooled, it may be used as an abrasive tool.

Thus, Oliver I discloses an IN-SITU technique for preparing an abrasive tool which requires placement of permanent tool protrusions on the external surface of a tool blank. These tool protrusions are the necessary surface for the magnetic formation of the conical structures of particles on the tool. The protrusions may take the form of small steel balls (as described in the '217 patent) or shapes formed by machining a profile in the external surface of the tool blank. In either case, the tool blank which is the foundation of the ultimate product must be covered with protrusions. The small steel balls or other protrusions formation are an added material cost and require additional labor to apply. If the protrusions are produced by machining a profile in the external surface of the tool blank, substantial skill and specialized equipment must be used.

Further, the carbide particles form structures which align with the magnetic flux emanating from the magnetized tool blank. In the case of a cylindrical structure, the cones align with magnetic flux emanating radially from the circumferential portion of the wheel. The conical structures formed thereby will be symmetrical in all respects, and when used as a cutting tool will offer a negative rake angle to the workpiece. The Oliver I technique is capable of producing only these symmetrical conical structures. If more aggressive rake angles or selectively oriented conical structures are desired, the Oliver I technique is not appropriate.

Finally, as with any cutting or abrading tool, heat produced during cutting and abrading is conducted from the point of contact between the tool and the workpiece into the structure of the tool. When using an Oliver I type tool, heat passes from the conical structures through small steel balls and into the tool blank. Since these balls are brazed to the tool blank, they offer little more than point contact and consequently present a substantial impediment to the flow of heat.

U.S. Pat. No. 4,916,869 hereinafter referred to as Oliver II, also discloses an abrasive grit structure comprising a plurality of peaked portions. However in Oliver II each peak has an apex including an abrasive grit particle which is surrounded by setting material that forms a substrate layer on which the peak portions are secured to provide an integral structure. In a first embodiment, the peaked portions are formed by using a mold having a plurality of concave indentations each of which receives an abrasive grit particle that is then surrounded by setting material to establish an integral structure. The setting material may contain additional abrasive particles. A second embodiment discloses a technique for molding using a mold having a plurality of concave indentations which are filled with abrasive grit particles that are then transposed to a substrate surface as individual abrasive elements. Such a concept and structure is similarly described in Woodell, et al. U.S. Pat. No. 2,001,911, Marvin No. 2,793,427, Heck No. 3,431,105 and Bellinger 3,102,011. In a third embodiment, a monolayer of abrasive particles are distributed on a flat planar surface and structurally interconnected by a first layer of resin saturated braze alloy and a second layer of resin saturated setting material. In the first and second embodiment, a braze alloy paste is applied to the abrasive grit structure after the structure has been applied to a tool surface (i.e., IN-SITU). In the third embodiment the braze alloy may be applied before the abrasive structures are applied to the ultimate tool (NON IN-SITU). Upon heating to braze conditions, the braze alloy infiltrates the abrasive grit structure and bonds the abrasive particles and setting materials to the tool surface.

OBJECT OF THIS INVENTION

Accordingly, it is an object of this invention to provide an abrasive tool which reduces the time of preparation, labor and material cost associated with placement of a pattern of protrusions on a base tool structure.

It is a specific object of this invention to provide an abrasive tool with abrasive particle structures directly secured to the base tool structure to improve the heat conduction away from the abrasive particle structures.

It is another object of this invention to provide an abrasive tool with abrasive particle structures selectively offering negative, neutral or positive rake angle cutting points to the workpiece.

It is another object of this invention to provide a matrix which may be incorporated in a process for manufacturing an abrasive tool which meets the aforestated objects and which minimizes the expense of manufacture.

It is another object of the present invention to provide a preferential arrangement of abrasive elements to accomplish a range of performance goals.

It is another object of this invention to provide a means to interconnect the abrasive grit particles with a flexible structure and conjunctively provide adequate support for the abrasive grit particles after installation on the tool surface.

It is another object of the present invention to provide a matrix which may be prepared independently of a tool base and subsequently made integral with a tool form.

Other objects, advantages and features of the present invention will become apparent upon reading the following detailed description of preferred embodiments and the appended claims and upon reference to the accompanying drawings.

SUMMARY OF THE PRESENT INVENTION

In accordance with one embodiment of the invention which achieves the foregoing objects, a fixture includes a generally planar magnetized base surface with protrusions formed thereon to form a dotted or patchwork or mosaic surface. The protrusions may be machined into the surface or applied to the surface in the form of small steel balls or other discreet elements. A release mechanism or covering layer is then placed over the surface of the protrusions. The release mechanism may take the form of, for example, a thin coating of silicone or a thin sheet of polymeric material (such as Teflon). These parts form a fixture for repetitive production of matrices.

Magnetizable abrasive particles are diffused or sprinkled onto the surface of the release mechanism. The particles collect or orient themselves along the lines of magnetic flux to form stacks, cones or elements having generally triangular cross sections. The distal portions of the stacks have an element axis and a distal portion or working portion. The stacks define a working surface for a tool. If small steel balls are used, conical structures or cones will form at the locations of magnetic flux concentration through the balls. A coat of acrylic paint is then applied to the elements and provides structural integrity to them. Prior to solidification of the paint, the cones may be shaped by passing a magnet near them. A magnet of opposite polarity from the polarity of the base surface magnet will cause the cones to grow in height; whereas, an identically poled magnet will cause the cones to flatten. This magnet may also be used to selectively orient the base surface magnetic field which emanates from the protrusions to cause a realignment of the elements. This technique is used to produce asymmetrical cones which offer neutral or positive rake angle cutting points on the working surface of the tool. After the cones have been shaped and the paint has dried or solidified, a braze paste or fixing means consisting of a binder mixed with braze alloy is applied to encapsulate the cones and form a structural interconnection or flexible support web or matrix between the cones. The paint maintains the integrity of the cones and the braze paste provides a support web which maintains the cones in preselected positions on a flexible web before brazing and the braze alloy joins the cones in a solid structure or pattern after brazing. After the braze paste binder has dried or solidified, the entire matrix may be removed from the base fixture leaving the balls or other projections in place for further use. The abrasive element matrix may then be cut to any desired shape. The release mechanism may then be removed from the matrix and the matrix may be secured to another base structure such as a tool form having a smooth surface by application of an acrylic adhesive. The acrylic adhesive may be brushed on the matrix or the base structure or in the alternative may be preinstalled and protected by a release liner. At this point, the assembly of matrix and base structure may be placed in a braze furnace and heated to the necessary brazing temperature while maintaining a controlled atmosphere such as hydrogen or a substantial vacuum. After the brazing process has been completed, the assembly will feature a high friction surface which may be used as an abrasive tool.

The advantages of the present invention are numerous. For one, the magnetic protrusions are secured to a reusable fixture. Consequently, it is not necessary to apply protrusions to the external surface of each tool. Therefore, magnetic field resources may be applied to create an optimum mosaic or pattern of protrusions which will then create respectively positioned magnetic fields. A mosaic may be selected to address performance parameters ranging from material removal effectiveness to surface finish quality. In addition, a substantial manufacturing cost advantage may be realized by eliminating the material cost of the balls as well as the labor associated with installing the balls on each tool.

Second, since the matrix is prepared on the generally planar surface of the fixture, which may be oriented in a horizontal plane, the carbide particles are influenced by magnetic flux acting along a flux axis generally transverse to the mosaic surface and aligned with gravitational forces. Consequently the complications and irregularities that are encountered when applying the particles directly to irregularly shaped tools is eliminated.

In addition, the structure of the cones of the present invention may be altered to produce a selectable rake angle (i.e., negative, neutral or positive). That is, the present invention is suitable for preparation of symmetrical cones. These cones are prepared by using magnetic flux having a flux axis which is generally perpendicular or normal to the mosaic surface. If a neutral or positive rake angle is desired, cones may be prepared by using a magnetic flux axis which is adjustable and determinable relative to the mosaic surface whereby the cone axis will have a predetermined rake angle relative to the surface. For example, a neutral rake angle cone will be formed if the magnetic field is oriented such that the apex of the cone is located over a perpendicular drawn to the base circle of the cone. A positive rake angle cone will be formed if the magnetic field is oriented so that the apex of the cone is located outside of a perpendicular drawn to the base circle of the cone. In practice, the magnetic field may be selectively oriented by creating a distortion above the surface of the fixture by use of a selectively positioned magnet or other ferromagnetic or electromagnet means.

The flexibility to produce cones having a selectable rake angle constitutes a substantial performance advantage in that tools may be prepared to suit specific performance applications. That is, cones having a positive rake angle may be applied to tools used in applications requiring aggressive material removal; whereas, cones having a neutral rake angle may be used for abrasive application requiring less material removal. Additionally, combinations of cone types may be applied to the surface of a tool so that portions of the tool may be used for aggressive material removal and other portions may be used for producing a desired surface finish. For example, the end or face portions may be covered with cones having a negative rake angle to achieve a desired surface finish.

BRIEF DESCRIPTION OF THE DRAWINGS

Further features and advantages of the present invention will be apparent to those skilled in the art to which the invention relates from the following detailed description of the invention made with reference to the accompanying drawings in which:

FIG. 1 is a side view of the fixture used for preparing the first embodiment of the present invention;

FIG. 2 is a cross sectional view of a portion of the fixture shown in FIG. 1 including a section of the cones prepared on the fixture according to the first embodiment of the present invention;

FIG. 3 is a cross sectional view of a portion of a base structure having a matrix prepared according to the first embodiment of the present invention applied thereto;

FIG. 3A is an enlarged section FIG. 3;

FIG. 4 is a cross sectional view of a portion of a base structure having a matrix prepared according to the first embodiment of the present invention applied thereto;

FIG. 5 is an enlarged section of a base structure having a matrix prepared according to the first embodiment of the present invention applied thereto;

FIG. 6 is an enlarged section of another base structure having another matrix prepared according to the first embodiment of the present invention applied thereto;

FIG. 13 is a side view with portions shown in cross section of a fixture used to prepare a matrix having structures featuring neutral rake angles;

FIG. 14 is a cross sectional view of the fixture including a matrix prepared according to the first embodiment of the present invention;

FIG. 15 is a cross sectional view of a portion of a base structure having a matrix prepared according to the first embodiment of the present invention applied thereto;

FIG. 29 is a cross section of a wheel including the abrasive coating of the present invention arranged to produce a square cornered groove; and FIG. 30 is a side view of a fixture for use in preparing a matrix according to the present invention, FIG. 31 is a plan view of flat arcuate segments A and B;

FIG. 32 is a cross sectional view of a flat sheet of matrix thermoformed over a curved die;

DETAILED DESCRIPTION OF THE PREFERRED EMBODIMENT

Figure 7:
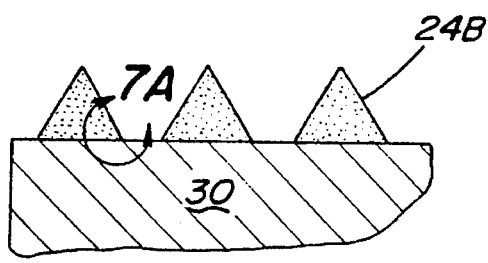
FIG. 7 is a cross sectional view of a portion of an abrading tool prepared according to the first embodiment of the present invention.

The first embodiment of the present invention, as shown in FIG. 1, includes a fixture 10 comprising a permanent magnet 12 which is affixed to a first base structure or plate 14. Plate 14 provides a magnetic gap between magnet 12 and protrusions or steel balls 16. Consequently, the thickness of plate 14 is a parameter which may be adjusted until the ideal magnetic field strength is achieved. Maximum magnetic field strength is achieved if plate 14 is completely eliminated and magnet 14 is placed in contact with protrusions 16. Alternatively, plate 14 may be suspended above magnet 12 to produce a selectively adjustable magnetic field by providing an adjustable height of suspension. Magnet 12 need not be fixed to plate 14 and may be in the form of an electromagnet, or the like.

A single layer of protrusions in the form of steel balls 16 are affixed by adhesive 20 to plate 14. Any ferrous or ferromagnetic structure may be used in lieu of balls; for example, cylindrical steel rods may be used. Balls 16 may be arranged to provide a pattern in which sequential rows of balls are arranged in an offset centered pattern, a straight centered pattern or merely a shifted centered pattern or if desired a random pattern. Release layer 18 may be a thin layer of a volatilizable material, a non-magnetic metal film, a low surface energy plastic coating applied to balls 16, a low surface energy plastic film such as Teflon or a suitable mold release fluid such as silicone. A 5 mil layer of Teflon is used in the preferred embodiment. A source of vacuum may be introduced to the region between the protrusions and release layer 18 by providing suitable passageways (not shown). The vacuum will draw release layer 18 into firm contact with protrusions 16. This completes the fixture upon which a matrix of braze paste and magnetically oriented abrasive particles may be prepared.

Matrix 22, as shown in FIG. 3 is prepared by sprinkling or diffusing −200/+325 mesh tungsten carbine particles having a cobalt binder sintered thereto (not shown individually in this figure) onto release layer 18. The particles are attracted and collect on release layer 18 at the locations of balls 16 as a result of the concentration of magnetic flux produced by the balls acting on the magnetic field provided by magnet 12. Abrasive particles used in the present embodiment exhibit properties of a ferromagnetic body by the nature of the particles themselves or as a result of a ferromagnetic coating such as cobalt or nickel.

If a plurality of particles are deposited on a single point of magnetic flux concentration, a conical collection of particles hereinafter referred to as cones will form an abrasive structure 24 having an aspect ratio which is a function of the applied magnetic field strength, the ferromagnetic responsiveness of the particles, and other variables such as agitation.

When the cones have reached a desired height by addition of particles, the cones are sprayed with an acrylic paint. While the paint is still wet, cones 24 may be shaped by passing a second magnet over the upper surface of the fixture. A second magnet 40 oriented to expose a pole opposite to that of magnet 12 is shown in FIG. 2. An oppositely poled magnet will cause the cones to grow in height; whereas, a matching poled magnet will cause the cones to flatten. One skilled in the art will recognize that second magnet 40 is utilized to enhance or alter the characteristics of magnet 12 and suitable conical structures may be produced without using second magnet 40. After the paint has dried or solidified, the cones are coated with a water based braze cement (not shown) which is exaggerated which provides a protective layer isolating the acrylic paint which protects the structural integrity of the cones from the solvent contained in the coating of interconnecting structure 26 which is added after the braze cement. A water based cement consisting of one part Nicrobraze Cement Type S, a trademark of Wall Colmonoy Corporation, and two parts water is preferred. One skilled in the art will recognize that release layer 18 may be removed from fixture 10 subsequent to drying of the paint 25 to reduce station time of fixture 10. Interconnecting structure 26 is then added to encapsulate the cones. The interconnecting structure 26 may consist of a binder or cement, preferably 50 percent by weight Nicrobraze Cement 1000, a trademark of Wall Colmonoy Corporation, and a braze alloy, preferably 50 percent by weight −325 mesh low melting point braze alloy. Any braze cement which dries or cures to provide a flexible structure will be satisfactory. Alternatively, various combinations and permutations of ingredients including braze cement, braze alloys, and setting material consisting of nonmelting particles may be used to provide a structural interconnection of abrasive structures. For example, abrasive cone-like structures 24 may be interconnected by a mixture of braze cement and nonmelting particles such as −325 mesh size tungsten carbide particles or −325 mesh Wall Colmonoy Nicrogap particles. Form 28 placed on release layer 18 serves as the outer boundary to which braze paste 26 will flow. The depth to which braze paste 26 is applied or the height of form 28 will define the thickness of the matrix.

Interconnecting structure 26 cures or dries to provide a flexible matrix 22. This matrix 22 and release layer 18 may then be removed from fixture 10 as a viable structural entity. Release layer 18 may then be removed from matrix 22 by peeling it away, Matrix 22 may be cut into desired shapes at this point in time although cutting can also be done before peeling from the release layer.

Matrix 22 may then be secured to base structure 30, as shown in FIG. 3, by use of a thin film of acrylic pressure sensitive adhesive. The base structure may be any tool or other support. Any suitable adhesive or binder which will vaporize and leave no residual ash may be utilized. The adhesive may be applied directly to the matrix and a release liner may be used to protect the adhesive during storage.

Release layer 18 functions to provide a mechanism promoting separation of matrix 22 from protrusions 16. If a metal film or a low surface energy plastic film is used, the respective film may be pealed away before matrix 22 is installed on structure 30 as already described. Alternatively, the metal film may have a melting point such that if left in place and brazed the metal film defines the interconnection between the abrasive cone structures 24 and base structure 30. If a volatilizable material is used, the material may be left in place and driven off by exposure to heat during the brazing process. If a mold release fluid or a low surface energy plastic coating is applied to protrusions 16, the matrix may be removed from the fixture 10 and applied directly to structure 30.

One skilled in the art may readily recognize that the release layer may in fact be a substantially nonferromagnetic structure having a thin section to which the abrasive structures are bonded as a result of a brazing operation or plating operation or through adhesion of the abrasive structures to the release layer by use of an appropriate binder. Such a structure may be used as an abrasive device in the form of a flexible sand paper. Alternatively, the structure may be an object such as a glove or boot which has portions coated to provide a high friction surface.

FIG. 3A is an enlarged section of FIG. 3 illustrating matrix 22 consisting of tungsten carbide particles 32 having a sintered cobalt binder, acrylic paint 31 and interconnecting structure 26, which preferably consists of braze alloy 34 and cement 36. After matrix 22 has been secured to the surface of base structure 30, the entire assembly may be placed in a braze furnace and heated to brazing conditions, that is, the necessary brazing temperature for the necessary time period. Any temperature between 1850° F. and 2050° F. for a time period of approximately 15 minutes is appropriate for a low melting point braze alloy. An atmosphere of pure dry hydrogen or a vacuum is recommended. A hold of 30 minutes is recommended at 800° F. before elevating to braze temperature. At braze temperature, braze alloy 34 will become molten and flow to form a mortar-like bond of metal 38 (as shown in FIG. 7A) which secures or joins the tungsten carbide particles 32 together individually and to the base structure 30. Thus, after brazing, only the braze alloy remains as all paints and binders have vaporized.

One skilled in the art will readily recognize that if interconnecting structure 26 consists of a layer of resin or a layer of braze cement and setting material and the coated cone structures 24 already have structural integrity, a braze alloy must be cast thereupon as a subsequent layer of braze alloy and cement either before or after matrix 22 has been secured to a tool surface.

Alternatively, matrix 22 may be prepared by including a braze alloy 34 within the abrasive cone structures 24 among the abrasive particles 32 (as shown in FIG. 5). The interconnecting structure 26 may be formed of a vaporizable cement 36. Such a matrix 22 may be removed from fixture 10 and applied to base structure 30 for a subsequent brazing operation as previously described.

Alternatively, matrix 22 may be prepared using abrasive particles 32 which have been coated with a braze alloy 34 in an acrylic binder 31 as shown in FIG. 6. The interconnecting structure 26 is formed of a vaporizable cement 36. Such a matrix 22 may be removed from fixture 10 and applied to a base structure 30 for a subsequent brazing operation as previously described.

Alternatively, matrix 22 may be prepared using abrasive particles 32 which are heated such that only a surface portion becomes molten and bonds to immediately surrounding particles and structures to form abrasive cone-like structures 24. FIG. 6 illustrates such a phenomena as portion 34 becomes molten so as to bond the remainder of particle 32 as described. Such a matrix 22 includes a vaporizable cement 36 to define the structural interconnection between abrasive structures 24. Such a matrix 22 formed on fixture 10 may be transferred to a base structure 30 for a subsequent sintering operation. While throughout this description the term "cone-like structures" has been used, it should be recognized that is a broad term including ridges, pyramids, or other patterns.

Figure 8:
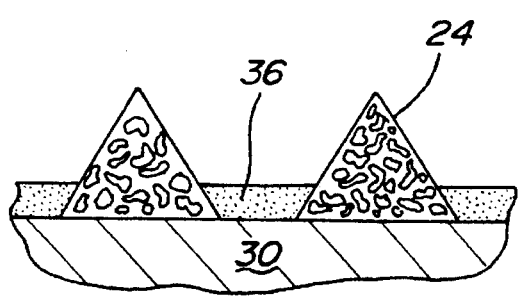
FIG. 8 is a cross section of a portion of a matrix prepared according to the first embodiment of the present invention applied thereto.
Figure 9:
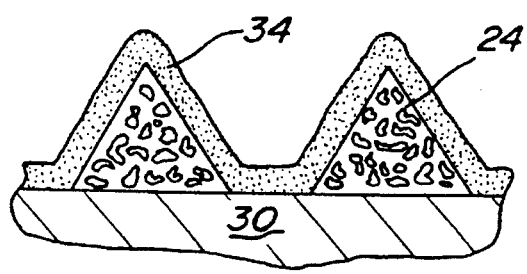
FIG. 9 is a cross sectional view of a tool base with a portion of an abrading tool prepared according to the first embodiment of the present invention.

Alternatively, matrix 22 may be prepared using a cement 36 to interconnect abrasive structures 24, as shown in FIG. 8, for subseqent securement to base structure 30 by a plating operation, as shown in FIG. 9. Those skilled in the art will recornized that numerous techniques may be utilized to define the structural interconnection of particles 32 to the base structure 30 including IN-SITU application of a braze past comprising braze alloy 34 and cement 36, as shown in FIG. 4 after this matarix is placed on base 30.

Figure 7A:
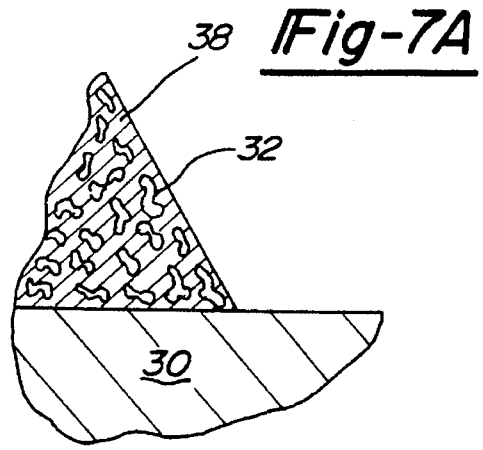
FIG. 7A is an enlarged section of FIG. 7.
Figure 33:
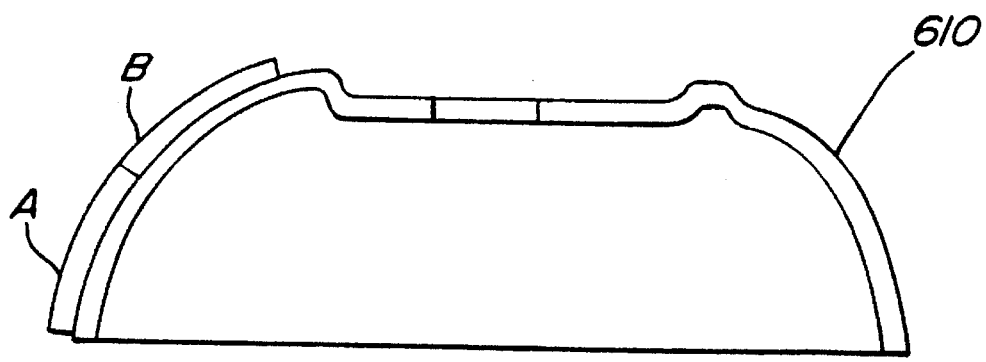
FIG. 33 is a side view of a semispheric or hemispheric like wheel coated with the matrix of the present invention.
Figure 34:
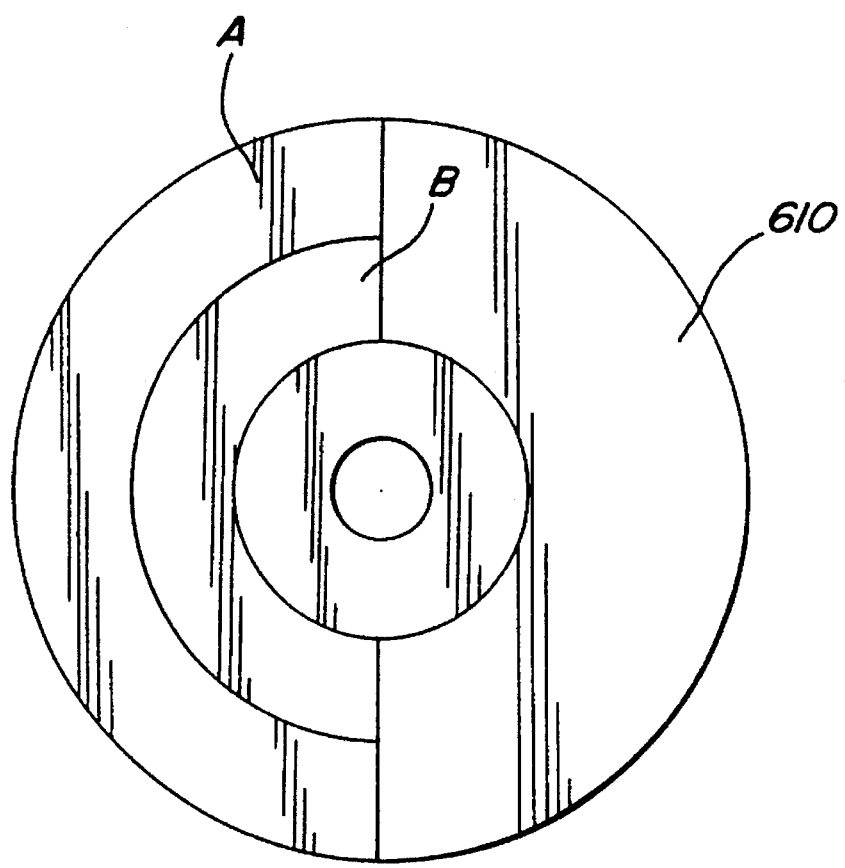
FIG. 34 is a plan view of a hemispheric-like wheel coated with the matrix of the present invention.

The final product, as shown in FIG. 7, is a base sstructure 30 which is armed with cone-like structures 24 B which provide the abrading tool cutting points. The base structure may be a cylindrical shape (such as a grinding wheel or an end mill), a flat rectangular shape (such as a hand file), or a long thin shape (such as a saw blade). Base structures which include a compound curve may be coated with an otherwise flat matrix 22 by trimming the matrix using known techniques to develop the respective shape form a flat sheet and alternatively the matrix may be thermoformed to a desired shape. Such a situation may be presented when trying to cover semicircular wheel 610 shown in FIG. 33 using the technique shown in FIGS. 31–34. Arcuate segments A, B formed of flat sheets may be used to proximate the spherical shape if several sements are used. A thermoforming operation may reduce the number of segments required. Thermoforming may be completed by exposing the flat sheets, A, B to a heat lamp or heated air supplied by a heat gun while the arcuate segments are situated on a die 612 as shown in FIG. 32 featuring a properly shaped profile. The matrix of one preferred embodiment of the present invention incorporates a thermoformable resin which becomes plastic upon heating and may then be formed into a desired shape which is retained upon subsequent cooling. Application of a thermoformed matrix such as A,B is accomplished in an identical manner to that previously described.

Figure 10:
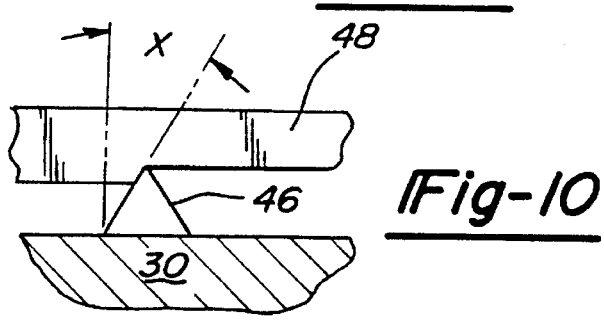
FIG. 10 is a cross sectional view of an abrading tool offering a negative rake angle to a workpiece.
Figure 11:
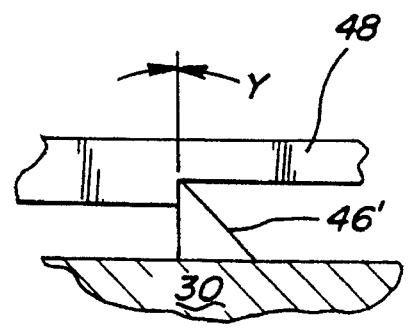
FIG. 11 is a cross sectional view of an abrading tool offering a neutral rake angle to a workpiece.
Figure 12:
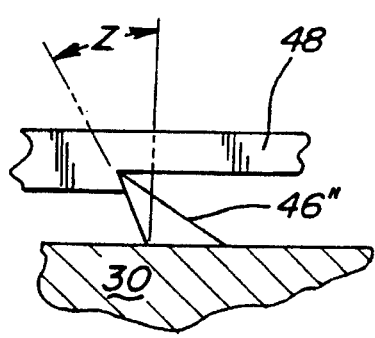
FIG. 12 is a cross sectional view of an abrading tool offering a positive rake angle to a workpiece.

A symmetrical cone 46 shown in FIG. 10 will present a negative rake angle X with respect to workpiece 48 and base structure 30. A negative rake angle is preferred in abrasive applications in which low-rate material removal is specified. A symmetrical cone 46 may be produced by the fixture previously described. FIG. 11 illustrates an asymmetric cone 46' having a neutral rake angle Y. A neutral rake angle is preferred in moderate-rate material removal applications. FIG. 12 illustrates another asymmetric cone 46" having a positive rake angle Z. A positive rake angle Z is preferred in aggressive-rate material removal applications.

These asymmetrical cones may be generated by using the fixture shown in FIG. 13. Fixture 52 comprises a permanent magnet 12, secured to plate 14, having steel balls 16 secured thereto. Release layer 18 is then placed over balls 16. Carbide particles (not shown individually in this figure) are then sprinkled through diffuser 56 onto release layer 18 to form cones 24 having generally symmetrical shapes. (See portion I). The magnetic flux emanating from the steel balls located in portion II is distorted by the presence of second magnet 40" such that the lines of flux in portion II are no longer emanating perpendicular to the surface. Other techniques to reorient the magnetic lines of flux such as the orientation of the magnetic flux source or placement of a ferromagnetic object above the surface of steel balls 16 may be used. Consequently, the cones located in portion II will align themselves with the reoriented lines of flux. The individual cone shown in portion II has a neutral rake angle. A positive rake angle is formed by locating magnet 40" farther to the right (in relation to this figure) from portion II. Acrylic paint is applied to cones 24 located in portion II by applicator 54. Once the paint has dried or solidified, the cones will maintain the orientation produced by the distorted lines of flux. The cones located in portion III are ready to be encapsulated with braze paste (not shown) as described previously. In actual operation, magnet 40", paint application mechanism 54 and diffuser 56 will move with respect to fixture 52 and thus prepare a continuous matrix of magnetically oriented carbide particles and braze paste.

Figure 16:
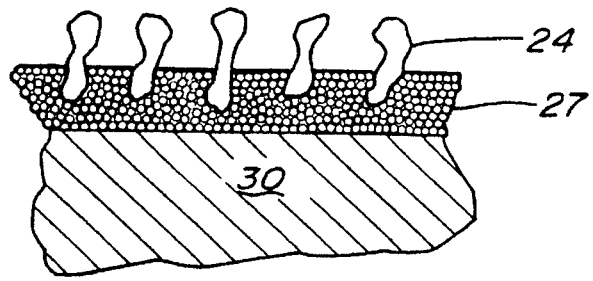
FIG. 16 is a cross sectional view of a portion of an abrading tool prepared according to the first embodiment of present invention.
Figure 17:
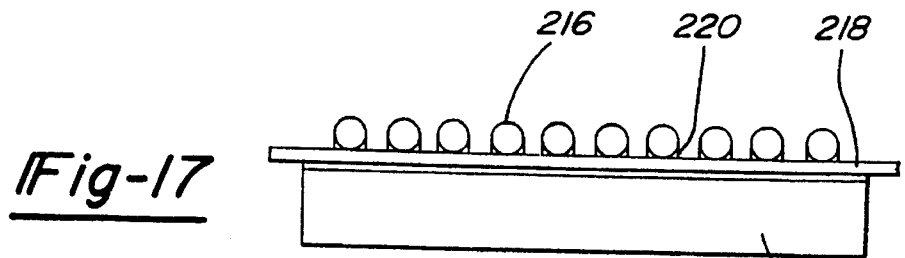
FIG. 17 is a cross sectional view of the flat planar surface used for preparing the second embodiment of the present invention.
Figure 18:
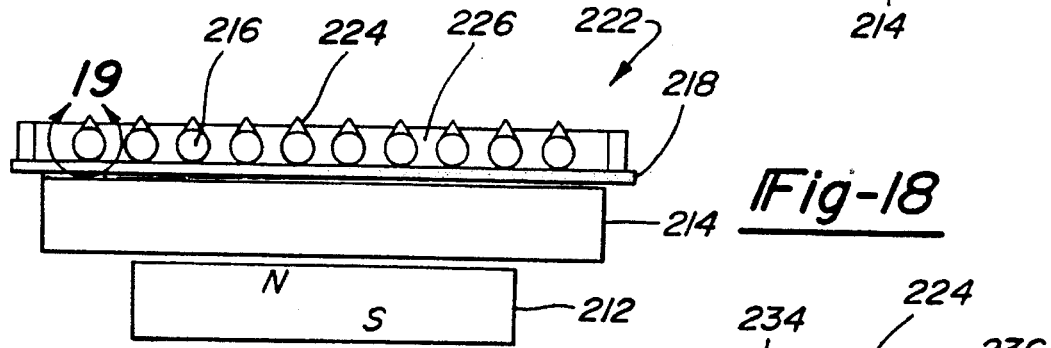
FIG. 18 is a cross sectional view of the flat planar surface used for preparing the second embodiment of the present invention exposed to a magnetic field and including an abrasive grit structure prepared thereon.
Figure 19:
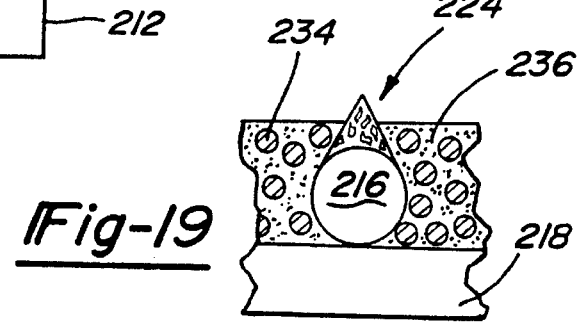
FIG. 19 is an enlarged section of FIG. 18.

One skilled in the art will recognize that a matrix 722 including a monolayer of abrasive particles 724, as shown in FIG. 14, may be prepared by distributing abrasive particles 724 on fixture 10 featuring magnetic flux concentrations produced by balls 716 and magnet 712. Particles 724 come to rest at the points of magnetic flux concentration and align with major axes parallel with the path of magnetic flux. A structural interconnection is prepared by casting a first layer of braze paste 726 and a subsequent layer of setting material 727 saturated with a hydrocarbon resin. Setting material used in the present embodiment is preferably a nonmelting particle smaller in size than abrasive particle 724. Such a structure may be transferred to a tool surface 730 shown in FIG. 15 with the planar surface defined by release layer 718 maintained as the outer peripheral surface. FIG. 15 is an enlarged view of the matrix including a layer of braze paste 726 including braze alloy 734 and braze cement 736. Subsequent to brazing to a tool surface 30 as shown in FIG. 16, setting material 727 which has been infiltrated by braze alloy 734, acts as a shim and maintains proper height of the respective abrasive particles such that a planar relation is maintained. Further, the casting process described herein is one technique to provide an even distribution of braze alloy or setting material. Other techniques such as distributing particles of braze alloy and/or setting material in dry form and then saturating same with a hydrocarbon resin may accomplish the same objective, Another embodiment of the present invention, as shown in FIG. 17, utilizes a flat planar nonferromagnetic support 214 including release layer 218, as previously described. A monolayer of ferromagnetic elements 216 is distributed either randomly or by mechanical positioning techniques or by distributing particles on a fixture defining magnetic flux concentrations as described in relation to the other embodiments of the present invention. Subsequent to distribution of ferromagnetic elements 216, a layer of resin 220 is applied to maintain the interpositional relation thereof. Next, a magnet 212, as shown in FIG. 18, is introduced to provide a magnetic field proximate support 214. Ferromagnetic elements 216 produce magnetic flux axes therethrough which function to collect subsequently applied abrasive particles (not shown individually) which are distributed in the manner previously described with respect to the first embodiment. Abrasive particles used in the present embodiment exhibit properties of a ferromagnetic body by the nature of the particles themselves or as a result of a ferromagnetic coating such as cobalt or nickel. In this embodiment of the present invention such particles collect to form conical structures 224 at the locations of magnetic flux formed by ferromagnetic elements 216. Next, an interconnecting structure 226 is formed to provide structural integrity to matrix 222. The interconnecting structure includes braze alloy 234 and braze cement 236 (as shown in FIG. 19). The release layer, transfer techniques and methods of providing structural interconnection as described in relation to the first embodiment of the present invention may be utilized to apply the respectively produced abrasive grit structure to a tool surface. In addition, the rake angle of conical structures 224 presented to the workpiece is subject to the orientation of the magnetic field passing therethrough and as such may be altered according to the principles defined in the first embodiment of the present invention. Although discrete ferromagnetic particles are shown providing loci of magnetic flux concentration, the concept of the second embodiment of the present invention can be accomplished using other known techniques to secure ferromagnetic elements to the release layer, such as applying collections of cobalt or ferrite powder and resin on the release layer using known printing techniques.

Figure 20:
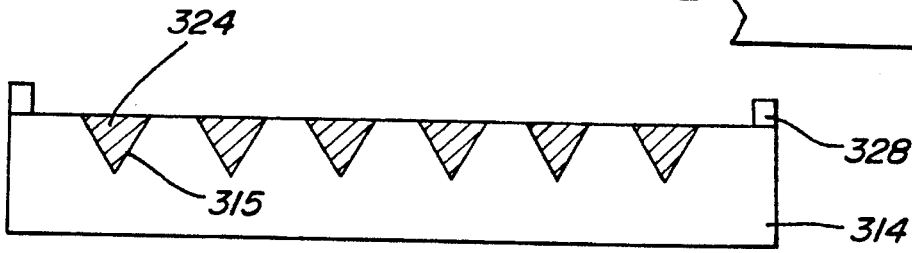
FIG. 20 is a cross sectional view of a mold used for preparing the third embodiment of the present invention.
Figure 21:
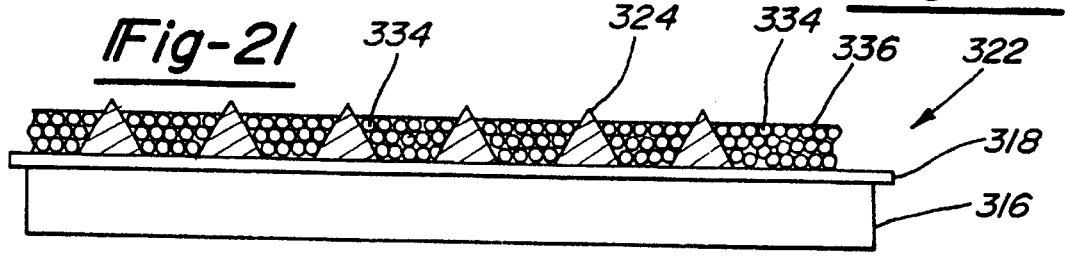
FIG. 21 is a cross sectional view of a matrix prepared according to the third embodiment of the present invention.

In still another embodiment, the abrasive structures 324 are prepared by use of a mold 314 having a plurality of concave indentations 315 as shown in FIG. 20. The indentations formed in the mold may be any shape which will provide a receptacle for a single abrasive particle or a plurality of abrasive particles. The indentations may be arranged to provide a pattern in which sequential rows of abrasive elements are arranged in an offset centered pattern, a straight centered pattern, or merely a shifted centered pattern or, if desired, a random pattern. In the examples shown in FIG. 20, abrasive structures 324 includes a plurality of abrasive particles (not shown individually) bound together by resin (not shown). However, in the alternative, a single abrasive particle may be placed in the indentation and surrounded and supported by setting material. Setting material used in the present embodiment is preferably a nonmelting particle smaller in size than the respective abrasive particle. As shown in FIG. 21, the abrasive structure 324 is released from mold 314 and deposited on a flat planar surface 316 covered by release layer 318. The plurality of abrasive structures 324 may be maintained in respective positions on layer 318 by application of a light magnetic flux, vacuum, registration with indentations, or registration with respective magnetic flux concentrations. Alternatively, the abrasive structures 324 may be maintained in respective positions defined by mold 314 by use of a light coat of resin applied to release layer 318, leaving the release layer tacky prior to deposition of abrasive structures 324 thereon. Referring back to FIG. 20, a structural interconnection may also be realized by use of a substrate layer interconnecting the abrasive structures comprised of resin or resin and nonmelting particles or resin and a braze alloy. The substrate layer may be created by filling mold 314 beyond the depth of indentations 315 up to dike 328.

One skilled in the art will readily recognize that the techniques to maintain the interpositional relationship of abrasive structures 324 are intended to maintain the respective abrasive elements in fixed positions as established in the mold 314 in FIG. 20. This position maintenance is temporary while subsequent operations are performed which define a more permanent interpositional relationship therebetween. Referring again to FIG. 21, next, an interconnecting structure 326 may be formed to provide structural integrity to matrix 322. In the preferred embodiment the interconnecting structure 326 includes braze alloy 334 and braze cement 336. Subsequent to release from layer 318 and installation on a base tool structure, the assembly is heated to braze conditions whereupon braze alloy 334 infiltrates abrasive structures 324 to form a bond therebetween and to said tool surface. The release layer, transfer techniques and methods of providing structural interconnection as described in relation to the first embodiment of the present invention may be utilized to apply the respectively produced abrasive grit structures to a tool surface.

Figure 22:
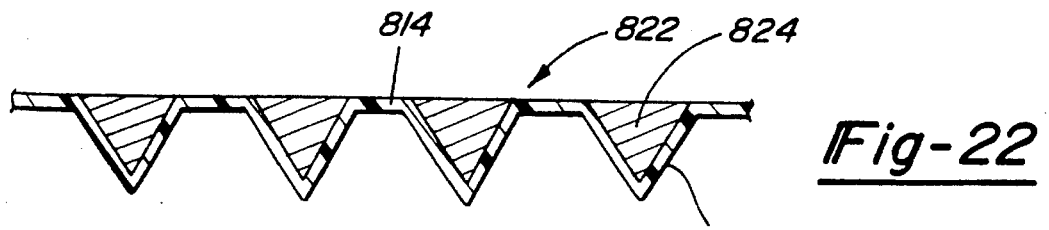
FIG. 22 is a cross sectional view of an alternative mold for preparing the third embodiment of the present invention.
Figure 23:
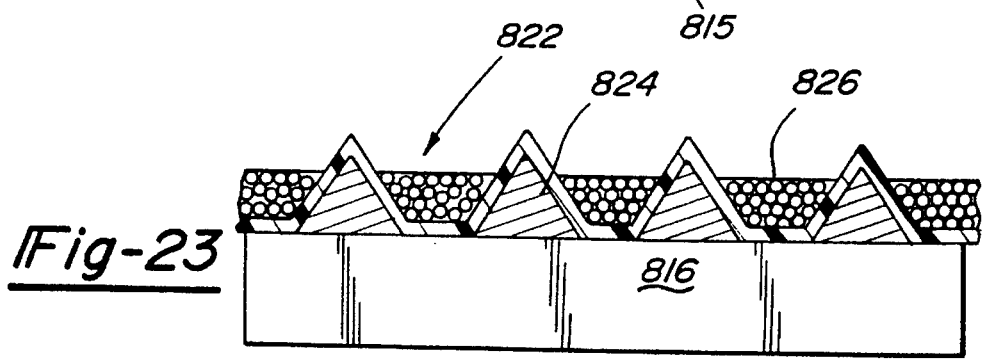
FIG. 23 is a cross sectional view of a matrix prepared according to the third embodiment of the present invention.

Alternatively, mold 814 as shown in FIG. 22 may be constructed from a volatilizable material. Examples include a mold formed of a film of polyester resin or a fluorocarbon which has been vacuum formed to provide indentations 815 for receipt of abrasive particles to form abrasive structures 824. As such, abrasive structures 824 may be maintained in the mold by application of a water based binder while interconnecting structure 826 is formed thereon as shown in FIG. 23. In the alternative, interconnecting structure 826 which is partially provided for by mold 814 may be accomplished by utilizing the many concepts previously described with respect to the first embodiment. For example, braze alloy may be included among the carbide particles of the abrasive elements 824. Alternatively carbide particles may be utilized which are coated with braze alloy or the abrasive particles may be sintered in place. Also, the abrasive particles may be plated in place. Finally, braze paste may be applied after mold 814 with abrasive elements 824 still in place has been secured to a tool base.

The matrixes prepared according to the techniques illustrated in FIG. 20 through 23 may be placed in a magnetic field causing abrasive elements 324 or 824 to act as magnetic flux concentrators. At such time additional abrasive particles may be added to the apex of such structures to enhance the cutting properties or life of abrasive structures 324 or 824. Examples of such abrasive particles may include nickel coated diamond particles or tungsten carbide particles having a cobalt binder imparting ferromagnetic properties thereto. Alternatively, such particles may be applied IN-SITU by first securing matrix 322 or 822 to a base tool structure and magnetizing same.

Figures 25, 26:
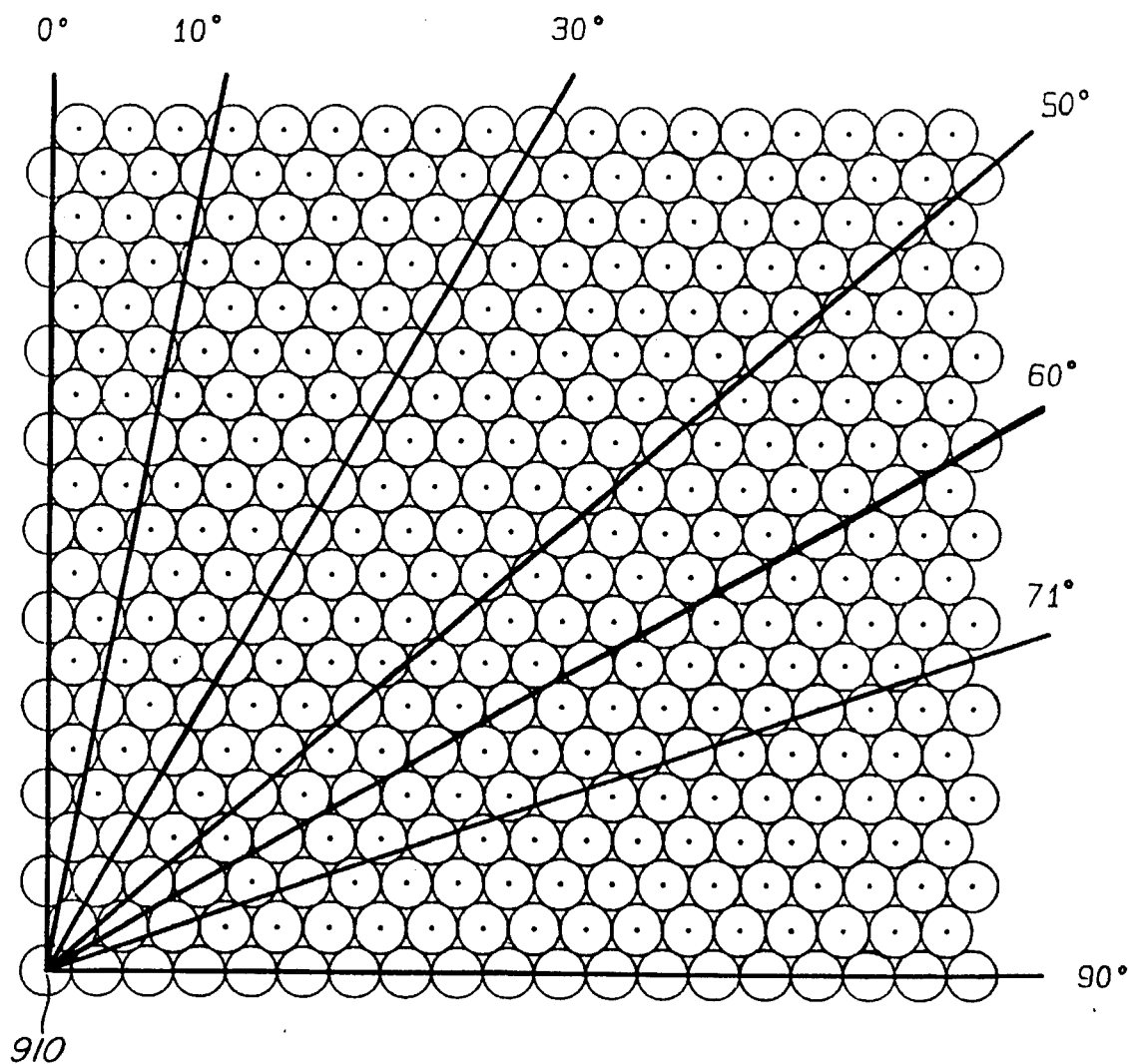
FIG. 25 is a plan view of an offset centered pattern of abrasive elements.
FIG. 26 is a side view of selected axes present in an offset centered pattern of abrasive elements.

The texture or relative coarseness which is presented to a workpiece by a tool incorporating the abrasive elements of the various embodiments of the present invention is a function of the spacing of the individual abrasive elements and the interpositional relationships therebetween. In practice, an optimization is sought to maximize the coarseness of the abrasive tool while continuing to achieve a given surface finish specification. Such an optimization will maximize tool life and productivity while reducing heating of the workpiece. One technique to accomplish such an objective is presented by Keeleric in U.S. Pat. No. 2,820,746. According to Keeleric, each abrasive element is displaced from the preceding element so that the path of each element through the workpiece does not overlap that of one or more preceding elements. Such a technique may be accomplished in the embodiments of this invention by creating a pattern of abrasive elements which are arranged in sequential rows having offset centers which may repeat from time to time. Such an offset centered pattern includes various axes along which sequentially positioned abrasive elements align themselves. These axes may be observed in side profile by moving to the various positions 0°, 10°, 30°, 50°, 60°, 70° and 90° or other similarly related angles as shown in FIG. 26. A variety of results may be accomplished by controlling the orientation of such a pattern with respect to the axis of relative motion between the pattern and the workpiece such axis of relative motion comprising the "workpiece path" or "path". For example, with the particular equilateral triangle pattern of abrasive elements shown in FIG. 25, if the 30° of 90° axes are aligned with the axis of relative motion, maximum material removal and maximum surface roughness will be realized. However, if another angle such as the 10°, 50° of 70° axes is aligned with the axis of relative motion, minimum material removal and maximum surface smoothness will be achieved.

It may be observed that if the pattern of FIG. 25 is laid on either an annular or peripheral, i.e., cylindrical, surface of a rotatably mounted disc, the 10 and 70 degree axes repeat as one moves about the pattern annular or periphery. Such repetition will continue about a center 910 in the II, III, and IV quadrants of the pattern (now shown). Most applications will benefit from selection of a coarse texture which has been oriented in proximate alignment with for example the 10° axis. Improvements in surface finish may be realized by using any variation in the range of 5 degrees thereabout. An ideal finish will be produced by using a first pattern with the path oriented at 5 to 15 degrees in a first portion of the finished tool followed by a second portion with a pattern oriented in the opposing direction relative to the path (i.e., −5 to 15 degrees) Such an alternative orientation produces an alternating sidewise sweeping motion not available if a random or consistent pattern is used.

Figure 27:
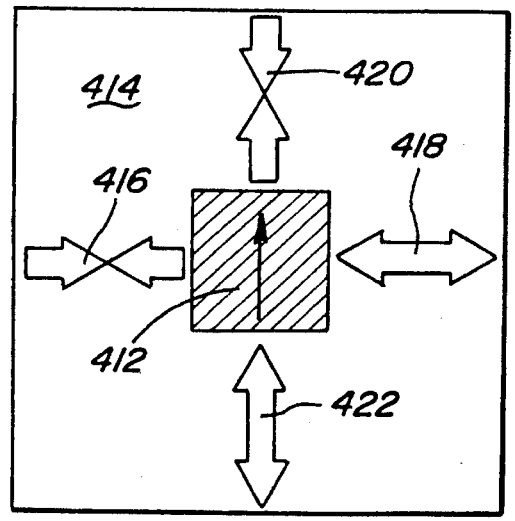
FIG. 27 is a plan view of a contact patch resulting from a tool engaging a workpiece.
Figure 28:
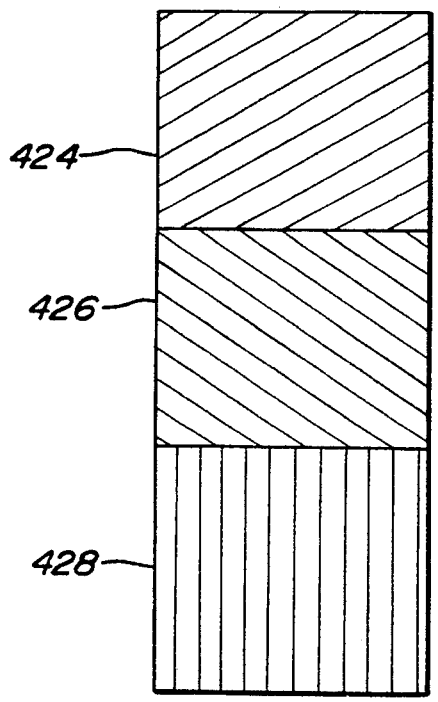
FIG. 28 is a plan view of sequential patterns of abrasive elements arranged on a tool.

When an offset centered pattern of abrasive elements is used to abrade a material having elasticity (such as rubber), stresses are imposed on the workpiece in the form of tension and compression (as shown in FIG. 27). In addition, any cant of such a pattern with respect to the axis of relative motion causes lateral stresses in the form of tension and compression. As shown in FIG. 27, if a pattern of abrasive elements engaging a workpiece is arranged in an offset centered pattern and canted with respect to the axis of relative motion of tool 412 indicated by arrow 411, that is, the path of the relative motion of the tool and the workpiece, a sideward thrust will be imparted to workpiece 414 resulting in compression 416 and tension 418. The side thrust is in addition to the normal compression 420 and tension 422 imposed by contact therebetween. Compression 416, 420 and tension 418, 422 which exist during the abrading process cause deformation of the workpiece which can result in removal of material which has been deformed out of position such that upon relief of the respective tension and compression the final unstressed dimensions are not identical to the dimension produced by the abrading process. Altering the cant of sequential first pattern 424, the first portion of the tool shown in FIG. 28 and the second portion with pattern 426 and/or interrupting the pattern by introducing discontinuities, as shown in the lower portion of FIG. 28, results in shifting of stress locations and intermittent relief of stresses. Interspersing patterns 428 in selected portions of the tool arranged with a major axis aligned with the axis of relative motion 430 will enhance the material removal rate while patterns 424 and 426 will provide for surface smoothness. To assure that the final dimensions of the workpiece in an unstressed condition is equal to the dimensions of the workpiece produced by the abrading process combinations and permutations of patterns may be sequentially arranged about the circumference of a wheel.

Figure 24:
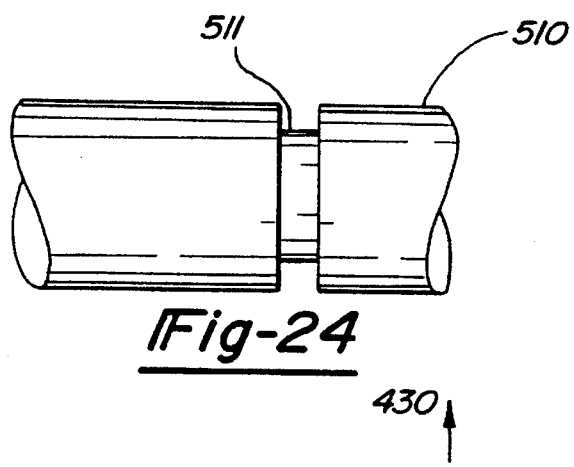
FIG. 24 is an illustration of a square cornered groove formed by the present invention.

Utilizing this concept of preferential orientation of the patterns of abrasive elements, a grooving wheel may be prepared which produces a square corner in workpiece 510 for example as shown in FIG. 24. The wheel 512 (as shown in FIG. 29) is produced by coating the circumference of the wheel with abrasive elements having element axes which are arranged generally complanar with each face 514,516 of wheel 512. The abrasive elements are produced in the manner previously described for generating neutral rake angle cones. A matrix produced using these previously described techniques may be cut along a line of cones and placed on the circumference of the wheel and aligned with the edge thereof. A portion of the circumference may be coated with a matrix as described and the remaining portion may be coated with cones oriented in the opposite direction as shown in FIG. 30. A smooth finish is produced by coating a portion of the circumference with a matrix oriented as previously described with the offset centered axis canted ±5° to 15° from the axis of relative motion with the workpiece. Alternatively, the cones in a single section of a matrix may be oriented to align with each edge while at the same time accomplishing the finishing objective of the present invention. Such a matrix could be prepared by utilizing a fixture as previously described and proportioned as per the illustration of FIG. 30.

It is further thought that the apparaatus and method of the present invention and many of its intended advantages will be understood from the foregoing description and it will be apparent that various changes may be made in form, construction and arrangement of parts thereof without departing from the spirit and scope of the invention or sacrificing all of its material advantages; the form herein before described being merely a preferred or exemplary embodiment.

What is claimed is:

1. An abrasive tool comprising a tool base having a supporting surface and an abrasive surface layer on said supporting surface, said abrasive layer for removing material from a workpiece surface by contact therewith and relative movement thereof along a tool axis, said abrasive surface layer comprising a plurality of abrasive surface layer portions aligned in adjacent relationship along a tool axis, each of said portions comprising a plurality of peaked abrasive elements extending from said supporting surface in a pattern of rows defining longitudinal spaces, said rows of said abrasive elements on at least one of said portions being disposed at an acute angle to said tool axis, and said angle being different on each of the adjacent abrasive portions.

* * * * *